United States Patent [19]

Sakakibara et al.

[11] Patent Number: 5,617,268
[45] Date of Patent: Apr. 1, 1997

[54] TRACKING CONTROL APPARATUS THAT SWITCHES POLARITY OF TRACKING ERROR SIGNAL ACCORDING TO DETECTED KIND OF PILOT SIGNAL

[75] Inventors: Yoshio Sakakibara, Neyagawa; Makoto Gotou, Nishinomiya, both of Japan

[73] Assignee: Matsushita Electric Industrial Co. Ltd., Osaka, Japan

[21] Appl. No.: 307,064

[22] Filed: Sep. 16, 1994

[30] Foreign Application Priority Data

Sep. 17, 1993 [JP] Japan ................................. 5-231190
Oct. 13, 1993 [JP] Japan ................................. 5-255610

[51] Int. Cl.⁶ ........................... G11B 5/584; G11B 5/58
[52] U.S. Cl. ......................... 360/77.14; 360/77.15
[58] Field of Search .............. 360/73.07, 77.14, 360/77.15

[56] References Cited

U.S. PATENT DOCUMENTS 4,573,089  2/1986  Maeda et al. ...................... 360/77
4,905,108  2/1990  Otokawa ......................... 360/77.14
5,081,550  1/1992  Yagisawa et al. .................. 360/78.02
5,412,520  5/1995  Saito ............................. 360/77.13

FOREIGN PATENT DOCUMENTS 0359019  3/1990  European Pat. Off. .
0380284  8/1990  European Pat. Off. .
0458531  11/1991  European Pat. Off. .
0508779  10/1992  European Pat. Off. .

*Primary Examiner*—Won Tae C. Kim
*Assistant Examiner*—Regina Y. Neal
*Attorney, Agent, or Firm*—Wenderoth, Lind & Ponack

[57] ABSTRACT

An information playback apparatus includes first and second heads which trace a tape on which tracking pilot signals having at least two different frequencies are selectively and periodically recorded with a period of at least 4 tracks, a pilot detector and identifier for generating an identification signal identifying the kind of tracking pilot signal dominantly contained in a playback signal of the first head, and a tracking error detector for detecting and outputting a tracking error signal from tracking pilot signals contained in a playback signal of the second head, wherein tracking control is performed based on the tracking error signal and the identification signal.

4 Claims, 14 Drawing Sheets

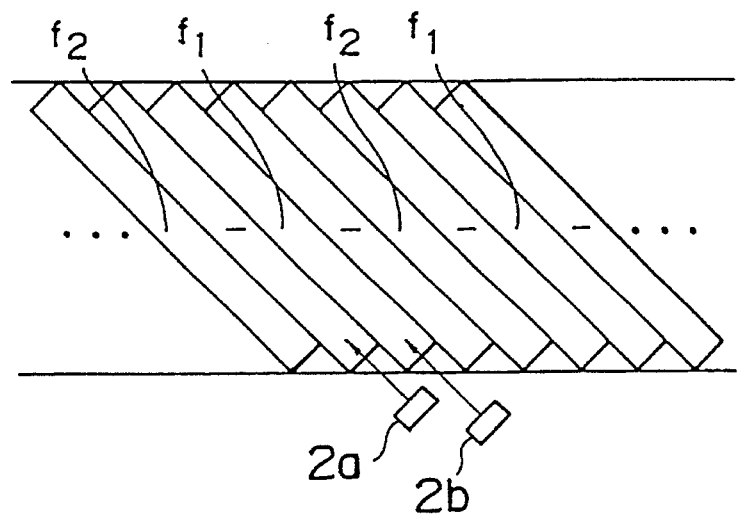
Fig. 2
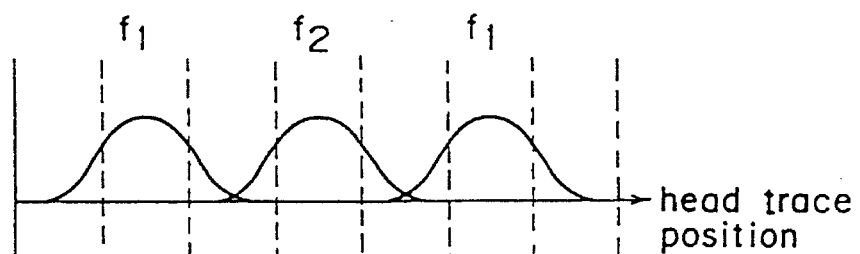
Fig. 3A
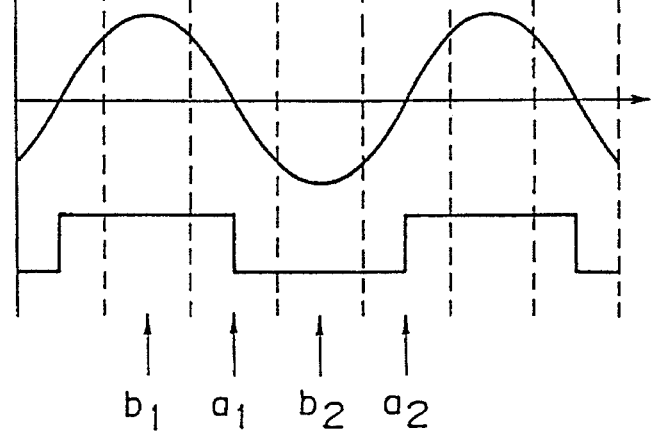
Fig. 3B
Fig. 3C

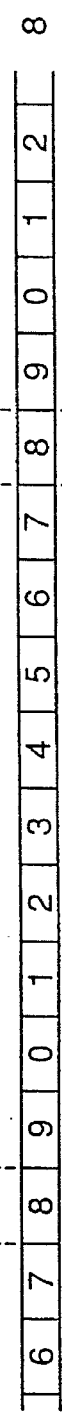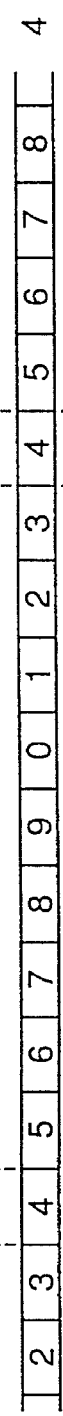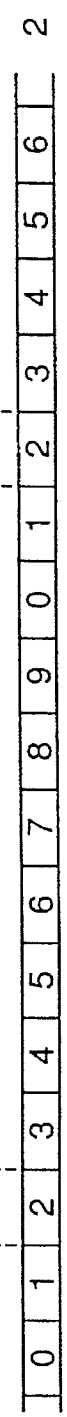
Fig.9A
Fig.9B
Fig.9C
Fig.9D
Fig.9E
Fig.9F
Fig.9G Fig. 10
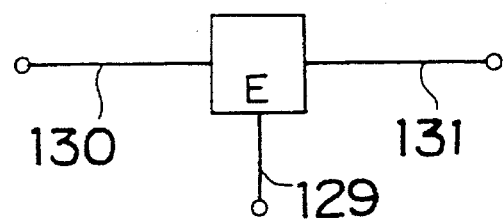
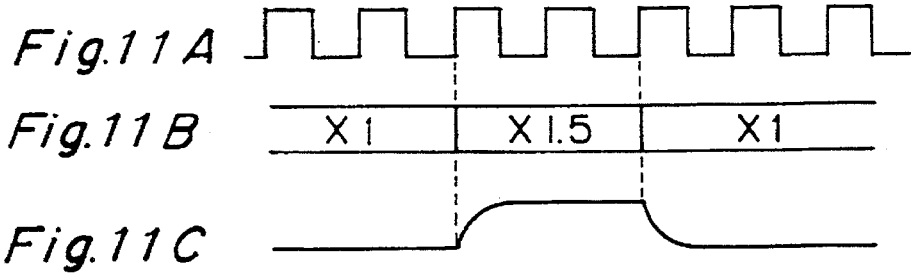
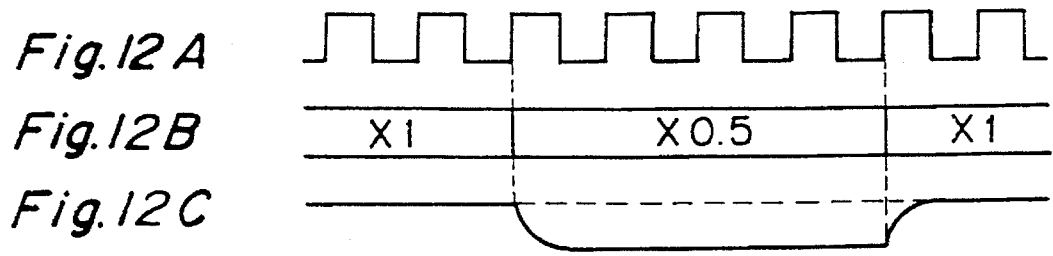

TRACKING CONTROL APPARATUS THAT SWITCHES POLARITY OF TRACKING ERROR SIGNAL ACCORDING TO DETECTED KIND OF PILOT SIGNAL

BACKGROUND OF THE INVENTION

1. Field of the Invention

The present invention relates to information playback apparatus that plays back information on pictures, sound, data, and the like.

2. Description of the Related Art

In an information playback apparatus that plays back information signals recorded as slanted tracks on the tape of a video tape recorder or the like, helical scanning is usually performed with rotating heads. In this case, a tracking control is necessary to control the trace positions of the heads so that the heads accurately retrace each track. As a method of the tracking control, a technique called ATF (Automatic Track Finding) is well known. For example, two kinds of pilot signals having different frequencies are multiplexed with a data signal and recorded on the tracks of the tape. An example of tracking control using these pilot signals is disclosed in U.S. pat. appl. Ser. No. 08/040983.

In such an information playback apparatus, when starting playback, a pull-in operation for tracking control is required. If the transient response time for completion of a pull-in is long, the operational responsiveness of the apparatus becomes deteriorated. In prior information playback apparatus using pilot signals, two kinds of zero-crossing points appear in the tracking error detection characteristics, each having a different polarity from the other. Tracking control is stable at one of these two zero-crossing points, but unstable at the other. Therefore, if the pull-in operation is started near an unstable zero-crossing point, it is completed when a stable zero-crossing point is reached. Therefore, there has been a problem in that a long time is required for completion of the pull-in operation.

Further, in the above example, the playback phase of the tape is corrected based on track numbers recorded on the tape, so that the phase of a played-back frame is synchronized with a reference frame phase. However, since a pull-in for tracking control requires some time, there has been another problem in that a long time is required for completion of synchronizing the frame phase.

SUMMARY OF THE INVENTION

An object of the present invention is therefore to get rid of the effects of unstable points on the tracking detection characteristics to speed up the tracking pull-in.

A further object of the present invention is to shorten the transition to a playback state by speeding up the tracking pull-in and the synchronization of the playback frame phase with a reference frame phase.

In order to achieve the aforementioned objective, according to one aspect of the present invention, an information playback apparatus of the present invention plays backs a signal by making heads that are mounted on a rotary cylinder trace a tape medium on which tracking pilot signals having at least two different frequencies are selectively and periodically recorded with a period of at least 4 tracks. The information playback apparatus is comprised of a first head, a second head, that traces a position shifted from the trace position of the first head by approximately one track, a pilot detection and identification means that detects the amplitudes of the tracking pilot signals from the playback signal of the first head to identify the kind of the tracking pilot signal dominantly contained in the playback signal of the first head and output an identification signal, a tracking error detecting means that detects the amplitudes of the tracking pilot signals recorded on tracks from the playback signal of the second head to make and output a tracking error signal, and a tracking means that performs tracking control based on the tracking error signal and the identification signal.

According to another aspect of the present invention, an information playback apparatus of the present invention plays back a signal by making heads that are mounted on a rotary cylinder trace a tape medium on which tracking pilot signals having at least two different frequencies are selectively and periodically recorded with a period of M tracks, where M is an even number no less than 4, data in one frame being divided into segments and recorded on H tracks, where H is an integer no less than 5 and non-multiple of M, and a track number identifying the position of each track in a frame being recorded in the track together with data. The information playback apparatus is comprised of a tape driving means that drives the tape medium to travel, a first head that is mounted in the rotary cylinder, a second head that traces a position shifted from the trace position of the first head by approximately one track, a pilot detection and identification means that detects the amplitudes of the tracking pilot signals from the playback signal of the first head to identify the tracking pilot signal dominantly contained in the playback signal of the first head and output an identification signal, a tracking error detecting means that detects the amplitudes of the tracking pilot signals from the playback signal of the second head to make and output a tracking error signal, a polarity control means that switches for control the polarity of the tracking error signal to make an error signal to perform tracking control by activating the tape driving means with the produced error signal, a reference signal generating means that generates a reference frame signal, a track number detecting means that detects the track number of one frame contained in the playback signals of the first and second heads to obtain a number detection signal, a correction amount detecting means that detects a phase-difference track number by comparing the number detection signal and the reference frame signal, and a phase correction means that performs phase correction using the tape driving means so that the phase-difference track number of the correction amount detecting means becomes a predetermined number.

By the above compositions, an information playback apparatus of the present invention identifies the kind of the tracking pilot signal contained in the playback signal of a first head in a pilot detection and identification means, switches the polarity of a tracking error signal produced from the tracking pilot signal contained in the playback signal of a second head to perform tracking control, so that stable tracking control is performed at all equilibrium points. During the pull-in operation, there are no effects of unstable points, and a pull-in to a nearest stable point is performed, so that a high-speed transition to a playback state is achieved.

Further, an information playback apparatus of the present invention performs tracking control by selecting the tracking polarity such that the control becomes stable at the current playback position based on an identification signal and a tracking error signal detected from the playback signals, and after correcting the playback phase so that a reference frame signal and the frame phase of the playback signals become in a predetermined relation, adjusts the tracking polarity to the playback phase to immediately resume stable tracking control. Therefore, the synchronization of the reference frame signal with the playback signals is achieved in a short time. In this way, the transition to a playback state speeds up, and an information playback apparatus having excellent operational responsiveness is provided.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 2 is a schematic illustration showing a track pattern on the tape.

FIG. 3 shows waveforms for describing the operation of a tracking error detector and pilot detection/identification circuit.

FIG. 9 is a timing chart showing the operation of a phase comparator.

FIG. 10 shows a circuit of the phase comparator.

FIG. 11 is a timing chart for describing the operation of a phase corrector.

FIG. 12 is a timing chart for describing the operation of a phase corrector.

DETAILED DESCRIPTION OF THE PREFERRED EMBODIMENTS

The preferred embodiments according to the present invention will be described below with reference to the attached drawings.

Figure 1:
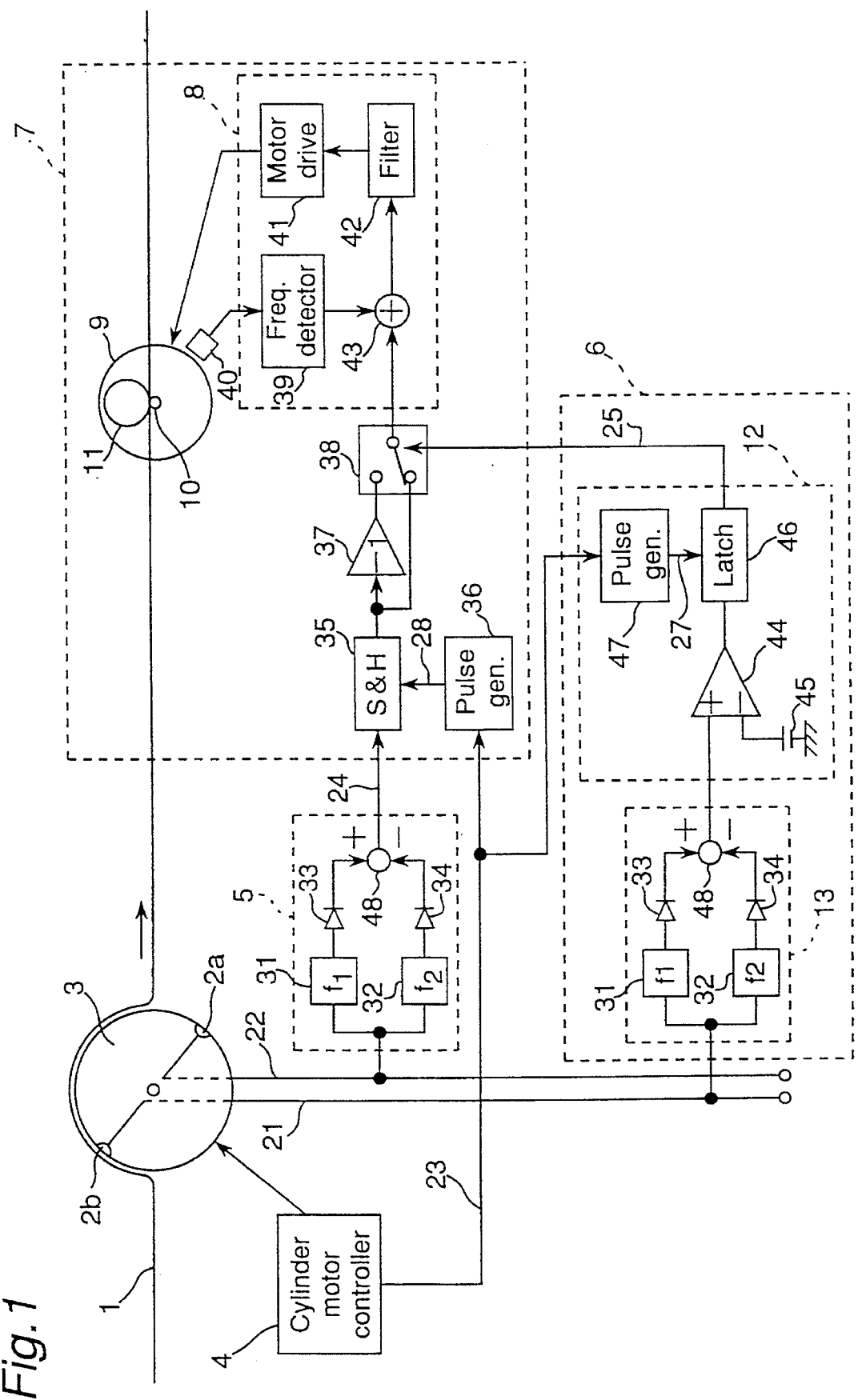
FIG. 1 is a block diagram of a first embodiment of the present invention.

FIG. 1 is a block diagram showing the composition of an information playback apparatus in accordance with the present invention. In FIG. 1, reference numeral 1 denotes a magnetic tape, 2a and 2b denote magnetic heads having different azimuths, 3 denotes a cylinder, 4 denotes a cylinder motor controller, 5 and 13 denote tracking error detectors, 6 denotes a pilot detection/identification circuit, 9 denotes a capstan motor, 10 denotes a capstan, 11 denotes a pinch roller, 12 denotes a pilot identifier, and block 7 surrounded by dotted lines denotes a tracking controller. The information playback apparatus composed in this way is described below with reference to FIGS. 2 and 3.

FIG. 2 schematically shows a pattern of tracks recorded on tape 1. Symbols f1 and f2 shown in slanted tracks indicate the kinds of tracking pilot signals multiplexed with data on the corresponding tracks. A first tracking pilot signal f1 and a second tracking pilot signal f2 having a frequency which is different from that of the first pilot signal are alternately recorded, each separated from the other by one track. The minus sign "−" indicates that no tracking pilot signal is recorded in the corresponding track. Further, tracks in which no pilot signal is recorded have the same azimuth as head 2a, and tracks in which pilot signals of f1 and f2 are recorded have the same azimuth as head 2b. Here, the frequency of each pilot signal is chosen to be comparatively low so that the pilot signal is not substantially affected by azimuth loss.

The tape 1 on which tracks are formed in this way is wrapped around cylinder 3 approximately 180 degrees, and travels in a longitudinal direction through capstan 10 and pinch roller 11. The rotational speed of cylinder 3 is controlled by cylinder motor controller 4 at a predetermined rotational speed. The rotation of capstan motor 9 directly connected to capstan 10 is controlled by a capstan controller 8, and tape 10 is moved by one track during a half revolution of cylinder 9. Capstan controller 8 is composed of a frequency detector 39, adder 43, filter 42, and motor driver 41, and controls the speed of capstan motor 9 based on an output signal of a rotation detector 40 attached to capstan motor 9. Heads 2a and 2b are mounted in cylinder 3 at the same height, each positioned opposite to the other at an angle of 180 degrees, and trace tape 1 as cylinder 3 rotates. By this composition, each of heads 2a and 2b traces one track apart as shown at the bottom of FIG. 2. Cylinder motor controller 4 detects the rotation phase of cylinder 3 and outputs one of the two values of a head switch signal 23, where each value indicates a head currently contacting tape 1. Specifically, if the head switch signal is at high level, then head 2a is contacting the tape, and if the head switch signal is at low level, then head 2b is contacting the tape.

A playback signal 22 of head 2a is input to tracking error detector 5. FIG. 3A shows the amplitudes of tracking pilot signals contained in the playback signal, where the abscissa is the head's trace position on the tape. The dashed lines show the boundaries between tracks on the tape, and the kinds of tracking pilot signals are shown on the top. When the head is tracing an f1 track, the component of the f1 pilot signal is great in the playback signal, and when the head is tracing an f2 track, the component of the f2 pilot signal is great. When the head is tracing a track between an f1 track and an f2 track, i.e. a track in which no pilot signal is recorded, f1 and f2 pilot signals are mixed from the two adjacent tracks into the playback signal.

In tracking error detector 5, the amplitudes of f1 and f2 components contained in the playback signal are respectively extracted by band-pass filters 31 and 32 and detected by amplitude detectors 33 and 34. Their difference f1−f2 is obtained by a subtractor 48 to be output as a tracking error signal 24. The tracking error signal 24 exhibits detection characteristics as shown in FIG. 3D depending on the head's trace position. The tracking error signal attains a maximum value on an f1 track and a minimum value on an f2 track and crosses the zero level on a track between them, i.e. a track in which no pilot signal is recorded.

Tracking controller 7 performs tracking control to make the tracking error signal 24 zero, in particular, adjusts the rotational speed of the capstan in the present embodiment.

By this control, head 2a is made to trace a track in which no pilot signal is recorded, i.e. a track having the same azimuth. Head 2b traces a track adjacent to tracks that are traced by head 2a, so that head 2b is also made to trace tracks having the same azimuth. In this way, all tracks on the tape are successively played back by the two heads 2a and 2b.

However, as seen from the pattern of FIG. 2, after each tracing of a track by head 2a, the arrangement of the tracking pilot signals are reversed. That is, if head 2a is in the position a1 of FIG. 3, then an f1 track is to the left of the head, while, if head 2a is in the position a2, then an f1 track is to the right of the head. As a result, the slopes of the tracking error signal is opposite in signs between the trace position a1 and a2 of head 2a. That means if the head is shifted in the same direction, from the positions a1 and a2, the changes in the tracking error signal are opposite. Therefore, in order to make constant the polarity of control, the polarity of the tracking error signal is alternately reversed and then non-reversed for each every tracing of head 2a before being input to the speed control system of the capstan.

Specifically, first, a sample holder 35 takes samples from the tracking error signal 24. Except during the period when head 2a traces the tape, the tracking error signal 24 is not obtained. Therefore, while head 2a traces the tape, a pulse generator 36 generates a sample pulse 28 based on the head switch signal 23. Sample holder 35 takes and retains samples from the tracking error signal based on this sample pulse. Further, an invertor 37 inverts the sampled tracking error signal, and a switch 38 switches the pre-inverted signal and post-inverted signal with each other. Switch 38 performs the switching operation based on an identification signal described later. If the tracking error signal becomes zero except during the tracing of head 2a, the sample holder 35 and pulse generator 36 are not necessary, and the tracking error signal 24 can be directly applied to invertor 37 and switch 38.

In the trace condition shown at the bottom of FIG. 3, that is, head 2b successively traces positions b1, b2, . . . , and head 2a successively traces positions a1, a2, . . . , the tracking error signal is zero during the period when head 2a traces the tape. However, depending on whether the inversion is performed during the trace of a1 or during the trace of a2, the polarity of the control system becomes completely reverse. The tracking error signal is zero in both cases, but one is stable and the other is unstable. If the control system is in an unstable condition, then a stable condition is attained after a pull-in operation that shifts the head by two tracks to reverse polarity. Further, at the start of the pull-in, the tracking error signal is approximately zero, so that the completion of the pull-in takes a long time. Moreover, whether head 2a is at a stable point or unstable point can not be determined by the playback signal 22 of head 2a.

However, in the playback signal 21 of head 2b, the tracking pilot signal f1 is dominant at the trace position b1, and the tracking error signal f2 is dominant at the trace position b2, so that the two positions can be distinguished from each other. Pilot detection/identification circuit 6 reads the playback signal 21 of head 2b, identifies the tracking pilot signal dominantly contained therein, and outputs the result as an identification signal 25. Pilot detection/identification circuit 6 is, for example, composed of a tracking error detector 13, which is the same as tracking error detector 5, and a pilot identifier 12 that judges the level (positive or negative) of the tracking pilot signal to output the result as an identification signal 25. Pilot identifier 12 is composed of a comparator 44, a reference voltage generator 45 that provides a reference voltage to the comparator, a latch 46, and a latch pulse generator that provides latch pulses 27 to the latch. The output voltage of reference voltage generator 45 is the level of the tracking error signal at a state where tracking control is correctly settled, in particular "0" in the present embodiment. Latch 46 is inserted since playback signal 21 is not obtained except during the trace of head 2b. Pulse generator 47 generates latch pulses 27, based on the head switch signal 23, during the periods when head 2b traces the tape, and latch 46 retains the value output from comparator 44 when a latch pulse is given thereto. As a result, the detection characteristics of the obtained identification signal 25 become as shown in FIG. 3C. If the identification signal 25 is at high level, then the f1 pilot signal is dominant, and if the identification signal 25 is at low level, then the f2 pilot signal is dominant. The timing of generating a pulse by pulse generators 36 and 47 is at least during the trace of heads 2a and 2b respectively, and hopefully, after the corresponding head starts tracing, and after the outputs of tracking error detectors 5 and 13 follow the level of the pilot signal in each track.

Tracking controller 7 switches control polarity based on the identification signal 25. By this means, the operation of polarity inversion in tracking controller 7 is made so that the control is in a stable condition. The polarity-switched tracking error signal is added to a capstan control loop composed of a rotation detector 40, a frequency detector 39, a filter 42, and a motor driver 41, so that tracking control is performed.

As described above, in the present embodiment, pilot detection/identification circuit 6 identifies the kind of the tracking pilot signal contained in the playback signal of head 2b, and tracking controller 7 switches the polarity of the tracking error signal 24 obtained from the pilot signals contained in the playback signal of head 2a, based on the identification signal 25. Therefore, the polarities of tracking control are switched so that tracking control is always stable. In particular, all the crossing-points of the tracking detection characteristics become stable equilibrium points. In this way, the playback signals of the heads can be used for the identification of tracking pilots as well as information playback, so that additional heads become unnecessary.

Further, if the trace position of the heads shift from the position a1 to the position b2 in FIG. 3, the identification signal 25 takes the same value at any interval between the −1 track and +1 track, as shown in FIG. 3C. Therefore, a polarity is selected so that the pull-in operation is performed to a nearer zero-crossing point. As a result, the time for a pull-in becomes minimum, and high-speed transition to a playback state (tracking pull-in) can be realized.

The switching between inversion and non-inversion in the tracking controller can be performed once during each revolution of the cylinder, and the switched polarity can be revised so that the identification signal 25 and the switching between inversion and no-inversion keep a predetermined relationship. In this case, if the identification signal 25 and the switching between inversion and non-inversion becomes out of the predetermined relationship, then after confirming that this state has lasted for a certain amount of time, the revision of the switched polarity is revised. In this way, the instability due to a low level of a tracking pilot signal of a playback signal and false judgement due to noise can be avoided when tracking is shifted. Therefore, a preferable result is obtained from the view point of stability of operation. However, the total time for the pull-in operation becomes longer by a period needed for the above confirmation.

Figure 4:
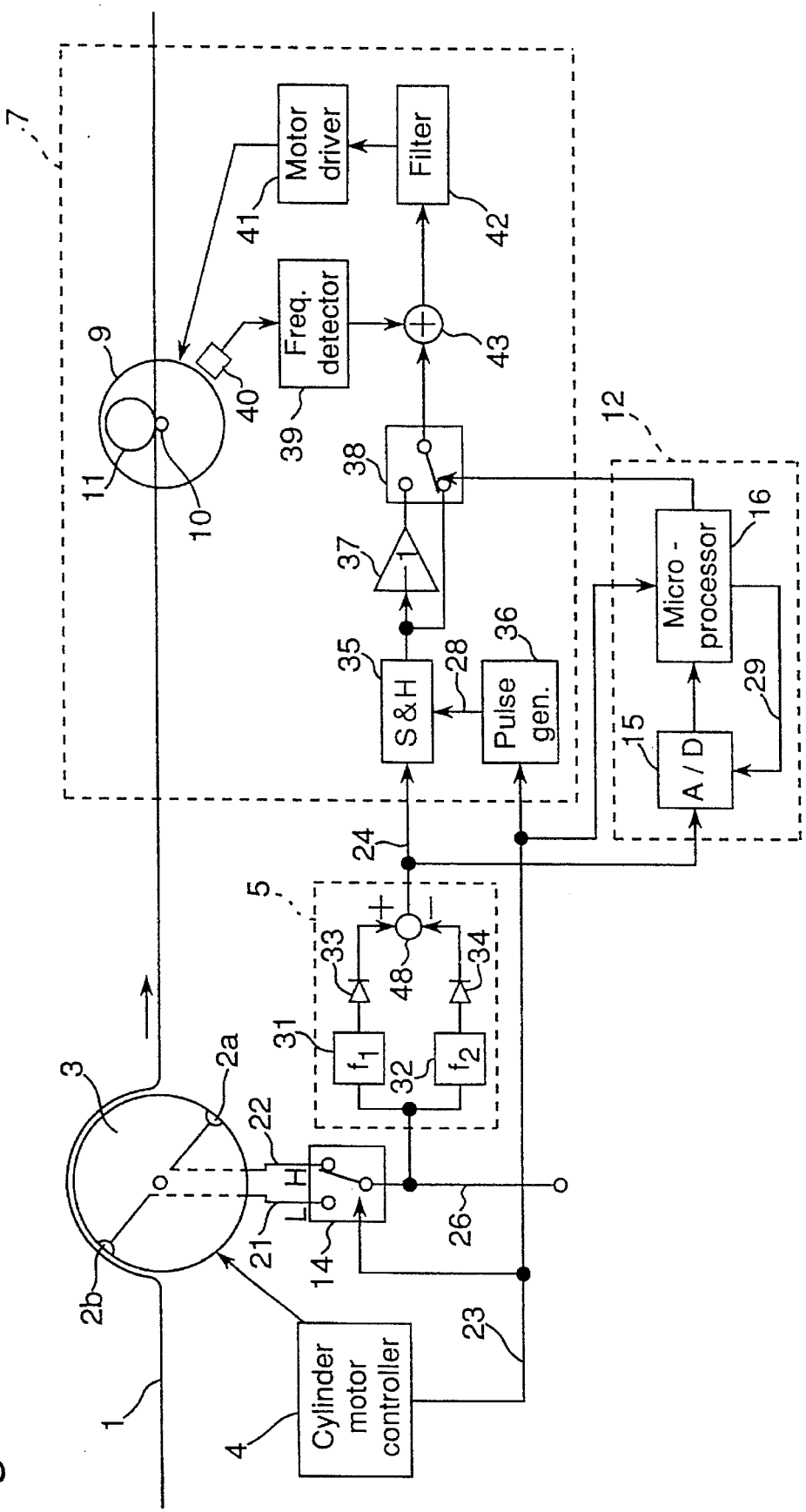
FIG. 4 is a block diagram of a second embodiment of the present invention.

Next, another embodiment is described in the following with reference to FIGS. 4 and 5. In this embodiment, the pilot detection/identification circuit 6 of FIG. 1 is simplified. At the same time, tolerance to noise that is multiplexed with the tracking error signal is enhanced during the pilot signal identification, so that pilot signal identification is performed with greater accuracy. FIG. 4 shows the composition of the present embodiment. The two tracking error detectors 5 and 13 in the composition illustrated by FIG. 1 are blocks having a completely equivalent function, so that they are combined into one block, which processes the playback signals of both head 2a and head 2b in time-sharing. A switch 14 works with the head switch signal 23 to select and combine the playback signals alternately obtained from heads 2a and 2b. Because of this composition, each effective playback period of heads 2a and 2b is preferably equivalent to at most 180 degrees of cylinder 3. In this case, if the head switch signal 23 is at high level, then switch 14 selects the intercept H, and if the head switch signal 23 is at low level, then switch 14 selects the intercept L. The positions of the tracking pilot signals on the tape are the same as in FIG. 2. The tracks in which tracking pilot signals f1 and f2 are recorded have the same azimuth as that of head 2b, and the tracks in which no tracking pilot signal is recorded have the same azimuth as that of head 2a. Further, the frequencies of the tracking pilot signals are chosen to be low so that they are not substantially affected by azimuth loss. In this case, the detection characteristics of the tracking pilot signals are approximately the same for both head 2a and head 2b, as shown in FIG. 3.

Figure 5:
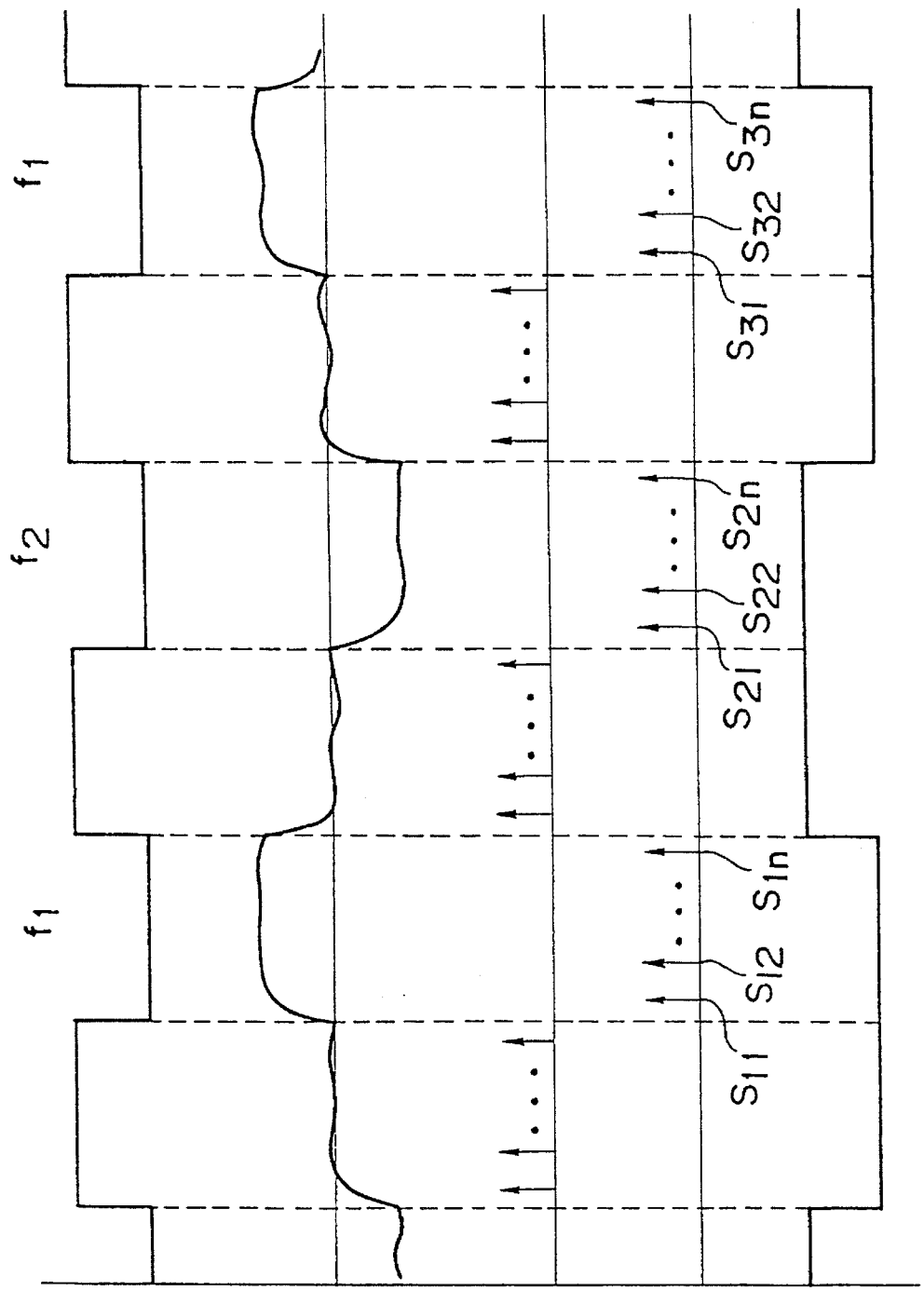
FIG. 5 shows waveforms for describing the operation of the second embodiment.

FIG. 5 shows waveforms of signals operating in sections of FIG. 4. In FIG. 5A is a head switch signal 23; at its high level, head 2a is issuing a playback signal, and at its low level, head 2b is issuing a playback signal. FIG. 5B is a tracking error signal 24 detected by tracking error detector 5 from the playback signal 26 that has been time-shared and combined with the head switch signal 23. The polarity is f1–f2, and head 2b is positioned on tracks in which tracking pilot signals shown on top of FIG. 5A are recorded. Therefore, when an f1 track is played back, the tracking error signal FIG. 5B is at high level, and when an f2 track is played back, the tracking error signal FIG. 5B is at low level. The tracking error signal FIG. 5B is approximately zero during the trace of head 2a. Tracking controller 7 takes samples from the tracking error signal FIG. 5B, during the periods when the head switch signal is at high level, as shown in FIG. 5C. Therefore, pulse generator 36 provide sample holder 35 with pulse signals shown in FIG. 5C. Here, the pulse signal may consist of a plurality of pulses during one trace period as shown in FIG. 5C, or may be one pulse.

Pilot identifier 12 is composed of an analog-to-digital converter 15 and a microprocessor 16. Micro processor 16 provides analog-to-digital converter 15 with a trigger signal 29 to fetch a digitized tracking error signal and outputs an identification signal 25 after performing the following processing. Microprocessor 16 creates a trigger signal 29 with timing as shown in FIG. 5D during the period when the head switch signal is at low level. Analog-to-digital converter 15 takes samples from the tracking error signal FIG. 5B with the timing of the trigger signal 29 to convert from analog to digital and provide the values to microprocessor 16. Here, the values of input samples are denoted by $S_{ij}$, where i indicates a trace number, and J indicates the order of sample values within one trace. Microprocessor 16 computes the following formula (1) for these sample values:

$$\sum_{j=1}^{n} S_{i,j} - \sum_{j=1}^{n} S_{i-1,j} \quad (1)$$

This computation consists of the processing of summing up the sample values within a trace and the subtraction of one sum from another sum for two traces. The processing of summing the sample values for each trace is necessary to reduce the effects of the noise component multiplexed with the tracking error signal as shown in FIG. 5B. Next, the difference between the sum for the current trace and the sum for the preceding trace is obtained. In this embodiment, the tracking error signal is given by the difference in the amplitudes of two pilot signals, but because of the frequency response of the playback system, even if the heads traces just an the tracks, the levels of two pilot signals contained in the playback signal may be different, and this difference in levels of pilot signals results in the difference in the direct currents of the tracking error signals. Therefore, in calculating the difference between the tracking error signals obtained from two traces, the difference in the direct currents is canceled out, so that, the accuracy of the identification is increased. If head 2b is tracing nearby a track in which no pilot signal is recorded, the tracking error signal obtained from the playback signal of head 2b becomes approximately zero, so that the above effects become clearer. Further, near a correctly settled tracking state, the level difference between the two traces is great, so that noise margins are increased by this subtraction.

Next, microprocessor 16 judges whether the computed result of formula (1) is positive or negative and outputs an identification signal based on the judgment. In the present embodiment, if the result is positive, the identification signal is set to high level, and if the result is negative, the identification signal is set to low level. The value of the identification signal is held until one period later of the head switch signal, when a computed result of the formula (1) for the next period is obtained. If the system has a sufficiently small noise component, the judgment can be made using one sample for each trace in place of summing a plurality of samples in the formula (1). Also, if the DC effects on the tracking error signal are small, then the difference operation can be omitted, and the judgment can be made based on the sample values of one trace.

Tracking controller 7 performs polarity switching for the sampled tracking error signal depending on the value of the identification signal at each time. For example, if the identification signal is at high level, then tracking controller 7 performs non-inversion, and if the identification signal is at low level, tracking controller 7 performs inversion. Then tracking controller 7 adds the result to the capstan control loop to achieve tracking control. In this case, the polarity is switched so that tracking control becomes stable. Alternatively, as with the embodiment of FIG. 1, the switching can be made once during each revolution of the cylinder, that is, based on the ½-frequency-divided signal of the head switch signal, so that if the identification signal and the switched polarity are not in a predetermined relationship, then after that state has lasted for a certain period, for example, n trace periods, where n is an integer, the identification signal is made reflected in the switched polarity.

As described above, in the present embodiment, tracking error detector 5 detects a tracking error signal from the playback signals of heads 2a and 2b, and pilot identifier 12 identifies the kind of the tracking pilot signal contained in a playback signal obtained during the trace of head 2b based on the tracking error signal. Tracking controller 7 switches the polarity of the tracking error signal 24 obtained from the playback signal during the trace of head 2a based on the identification signal 25 to use for tracking control. Therefore, a pull-in to a nearest equilibrium point is performed, so that speed-up of transition to a playback state (tracking pull-in) is achieved. Further, part of the pilot detection/identification circuit of the embodiment shown in FIG. 1 is combined into the tracking error detector, so that the composition is simplified. Further, in the pilot identifier, the computation of the formula (1) results in the suppression of the noise component multiplexed with the tracking error signal and the suppression of the effects of the shifting values of the direct currents. By these means, the accuracy in the pull-in process and in the operations of the pilot identifier after the pull-in is increased.

Figure 6:
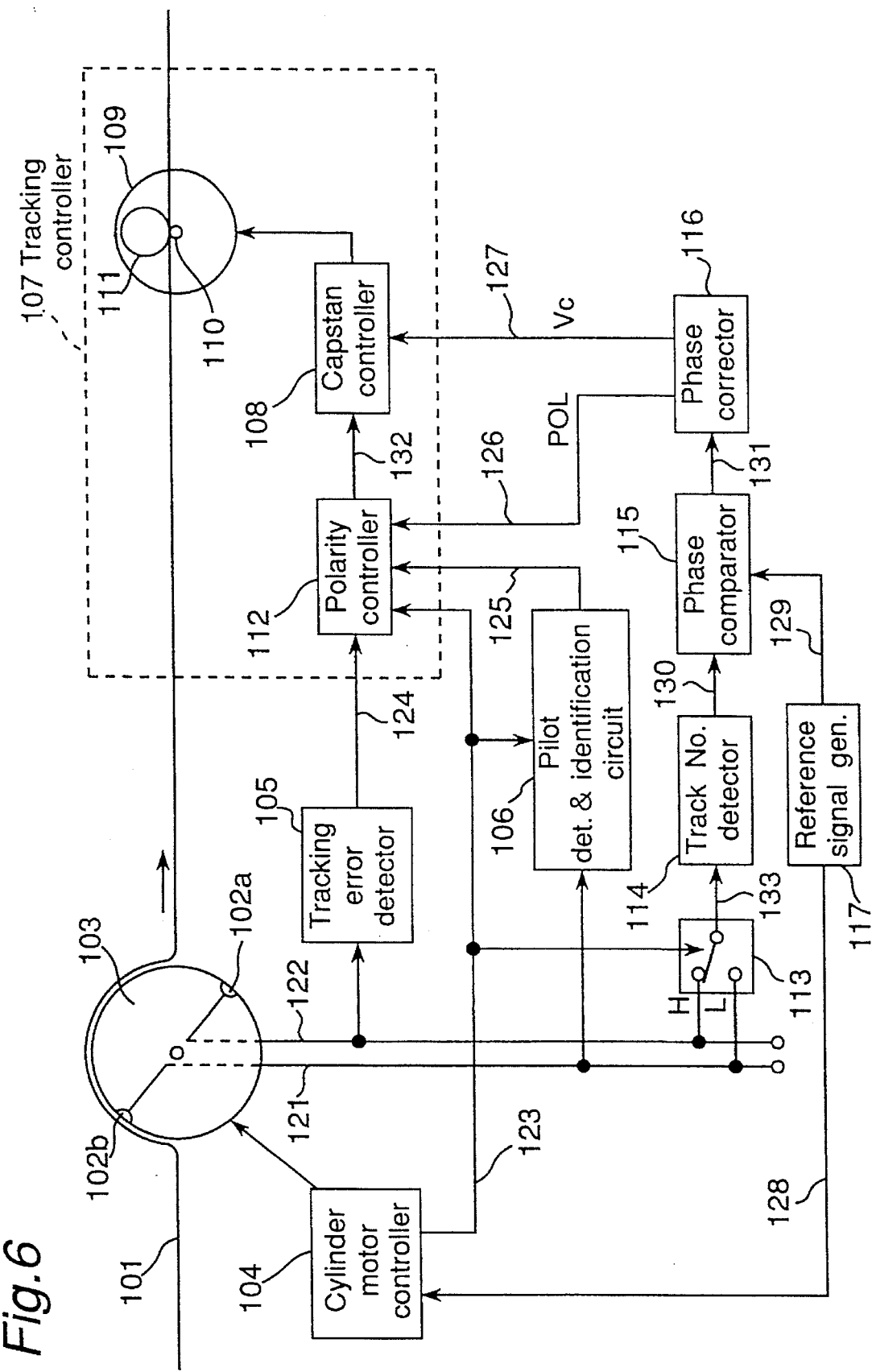
FIG. 6 is a block diagram of another embodiment of the present invention.

Next, another embodiment of an information playback apparatus in accordance with the present invention is described in the following with reference to accompanying figures. In this embodiment, not only is there a speed-up of the pull-in tracking control, the phase of a played-back frame is swiftly adjusted to that of a reference signal, when a frame is composed of a plurality of tracks. FIG. 6 is a block diagram of the present embodiment. In FIG. 6, 101 is magnetic tape, 102a and 102b are magnetic heads having different azimuths, 103 is a cylinder, 104 is a cylinder motor controller, 105 is a tracking error detector, 106 is a pilot detection/identification circuit, 108 is a capstan controller, 109 is a capstan motor, 110 is a capstan, 111 is a pinch roller, 112 is a polarity controller, 113 is a switch, 114 is a track number detector, 115 is a phase comparator, 116 is a phase corrector, 117 is a reference signal generator. Further, the block 107 surrounded by block lines is a tracking controller. An information playback apparatus composed as above is described in the following.

First, the tracking control operation is described. Heads 102a and 102b are mounted in cylinder 103 at the same height, each positioned opposite to the other at an angle of 180 degrees. Cylinder 103 is rotated by a built-in motor (omitted from FIG. 6), and heads 102a and 102b trace the tape 101, which is wrapped around the cylinder. Cylinder motor controller 104 controls the speed and phase of cylinder 103 so that the rotation of the cylinder is synchronous with a reference rotation signal 128 provided by reference signal generator 117. Cylinder motor controller 104 identifies the rotation phase of cylinder 103 to output an HSW signal 123 that identifies the head currently tracing the tape. The HSW signal is a two-valued signal having a 50% duty factor; its high level corresponds to periods when head 2a is tracing the tape, and its low level corresponds to periods when head 2b is tracing the tape.

Figure 7:
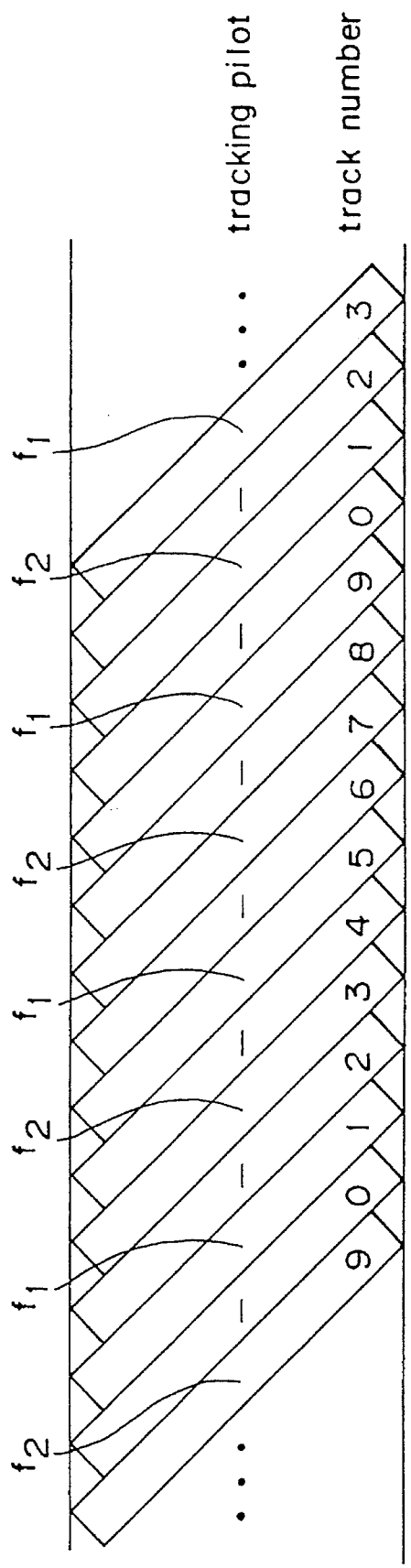
FIG. 7 shows a track pattern on the tape.

FIG. 7 schematically shows a pattern of tracks recorded on tape 101. Symbols f1 and f2 shown in slanted tracks indicate the kinds of tracking pilot signals multiplexed with data on the corresponding tracks. A first tracking pilot signal f1 and a second tracking pilot signal f2 having a frequency which is different from that of the first pilot signal are alternately recorded, each separated from the other by one track. The minus sign-indicates that no tracking pilot signal is recorded in the corresponding track.

Each number shown below a track is its track number, which is recorded in the track. In this example, data in one frame is divided into segments and recorded on 10 tracks, and tracks in each frame are numbered from 0 to 9. And concerning a period in which the frequency of a pilot signal reappears, i.e. 4 tracks, and the total track number of one frame, neither is a multiple of the other. Therefore, a frame starting with a-track followed by an f1 track and a frame starting with a-track followed by an f2 track alternately appear. As a result, a tracking pilot signal recorded in a track can not be identified by the track number. However, a track having an even track number has the same azimuth as that of head 102a, and a track having an odd track number has the same azimuth as that of head 102b.

The tape 101 on which tracks are recorded in this way is wrapped around cylinder 103 approximately 180 degrees, and travels in a longitudinal direction through capstan 110 and pinch roller 111. The rotation of capstan motor 109 directly connected to capstan 110 is controlled by capstan controller 108, and tape 101 is moved by one track during a half revolution of cylinder 103.

Figure 8A:
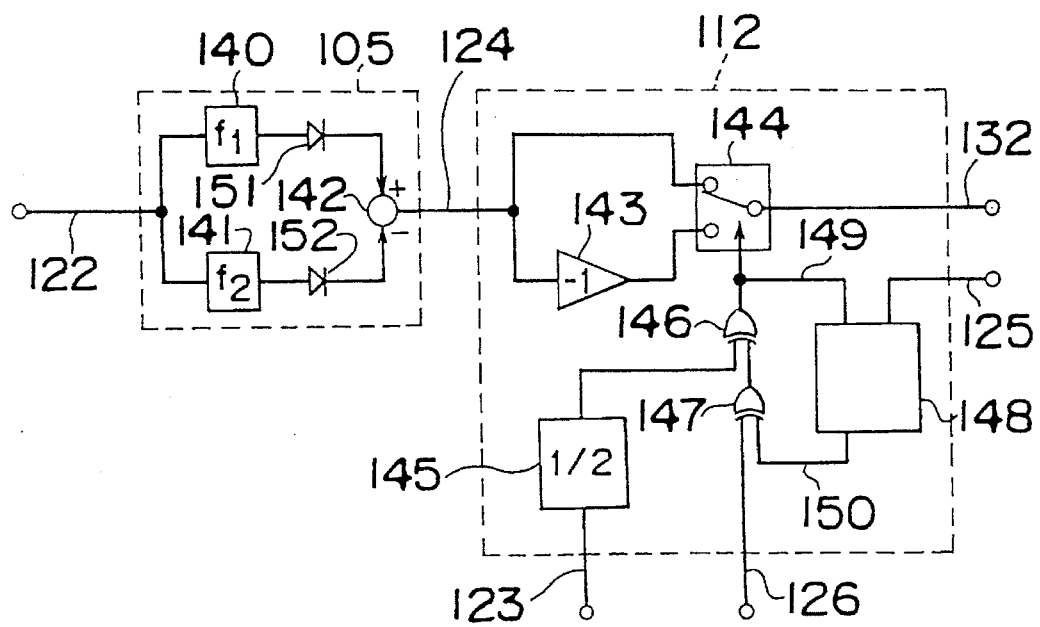
FIG. 8A and FIG. 8B show block diagrams of a tracking error detector and polarity controller, respectively.

Tracking error detector 105 detects, from a tracking pilot signal contained in the playback signal of head 102a, a relative shift between the head and the track to output a tracking error signal 124 having a value equivalent to this shift. The detection characteristics of the tracking error signal corresponding to the trace position are given by FIG. 3, as in the previous embodiments. FIG. 3A shows the amplitudes of tracking pilot signals contained in the playback signal, where the abscissa is the head's trace position on the tape. The dashed lines show the boundaries between tracks on the tape, and the kinds of tracking pilot signals are shown on the top. Tracking error detector detects the amplitudes of the f1 and f2 components contained in the playback signal to output their difference (amplitude of the f1 component-amplitude of the f2 component) as a tracking error signal 124. The composition of the tracking error detector is shown in FIG. 8A as the block 105 surrounded by dotted lines. The outputs of band-pass filters 140 and 141, which have respective central frequencies of f1 and f2, are input to amplitude detectors 151 and 152, which respectively obtain the amplitudes of the f1 and f2 components, and a subtractor 142 obtains their difference. The tracking error signal 124 shows the detection characteristics corresponding to the positional shift of the head from the track as FIG. 3B.

Polarity controller 112 processes the tracking error signal 124 to provide the result to capstan controller 108. By this means, tracking control is performed so that the tracking error signal 124 eventually becomes zero. However, is clear from the track pattern of FIG. 7, each time when head 102a traces the tape, the positions of tracking pilot signals in the adjacent tracks are reversed, so that as in the trace positions a1 and a2 of FIG. 3, the polarity of the tracking error signal is reversed. Therefore, in order to make constant the polarity of control, the polarity of the tracking error signal is reversed (switched between inversion and non-inversion) at each trace of head 102a before being added to the capstan speed control system in tracking controller 107.

In the trace condition shown at the bottom of FIG. 3, that is, if head 102a successively traces positions a1, a2, ..., and head 102b successively traces positions b1, b2, ..., the polarity of the control system becomes completely reverse depending on whether the inversion is performed during the trace of a1 or during the trace of a2, although the tracking error signal is zero in both cases. That is, one is stable and the other is unstable, and if the control system is in an unstable condition, then a stable condition is attained after a pull-in operation that shifts the head by two tracks to reverse polarity. Further, the completion of the pull-in takes a long time compared with the case where the tracking error signal linearly varies with the shift of the head. Moreover, whether head 102a is at a stable point or unstable point can not be determined by the playback signal 122 of head 102a.

However, in the playback signal 121 of head 102b, the tracking pilot signal f1 is dominant at the trace position b1, and the tracking error signal f2 is dominant at the trace position b2, so that the two positions can be distinguished from each other. Pilot detection/identification circuit 106 reads the playback signal 121 of head 102b, identifies the tracking pilot signal dominantly contained therein, and outputs the result as an identification signal 125. The composition of pilot detection/identification circuit 106 is the same as the pilot detection/identification circuit 6 of the first embodiment shown in FIG. 1. The detection characteristics of the obtained identification signal 125 becomes as shown in FIG. 3C. If the identification signal 125 is at high level, then the f1 pilot signal is dominant, and if the identification signal 125 is at low level, then the f2 pilot signal is dominant.

Polarity controller 112 switches polarity depending on the value of the identification signal 125. The composition of polarity controller 112 is shown in FIG. 8A as a block surrounded by dotted lines. The switching between inversion and non-inversion is performed once during each revolution of the cylinder to revise the switched phase so that the identification signal 125 and the switching are in a predetermined relationship. The polarity of the tracking error signal 124 is reversed by an invertor 143, and the pre-inverted and post-inverted tracking error signals are switched by a switch 144. The output of switch 144 is provided to capstan controller 108. Switch 144 performs the switching operation based on the level of a polarity signal 149, which is obtained from the HSW signal 123. Specifically, the HSW signal is frequency-divided into a signal having ½ the original frequency by a frequency divider 145 and input to an EX-OR gate 146, which outputs the polarity signal 149. By this means, polarity is switched once for each trace of head 102a, and the polarity of the tracking error signal becomes constant. Now, assume that the capstan controller 108 is composed so that if the polarity signal 149 and the identification signal 125 have the same phase, then tracking control is stable. Assume also that the value of the input polarity setting signal 126 is constant. The polarity signal 149 is compared with the identification signal 125 for their phases by a phase comparator 148, which inverts the input polarity signal 149, if the polarities of the two input signals disagree. If their phases disagree, then tracking control is unstable, so that the output signal 150 of the comparator is inverted from the input signal 149, that is, the other input signal of gate 146 is inverted, and the switching polarity, that is the polarity of the tracking error signal 132 sent to capstan controller 108 is reversed.

Further, in this case, if the phases of the identification signal 125 and the polarity signal 149 disagree, phase comparator 148 may invert the polarity signal 149 after the state has lasted for a certain period. If tracking deviates by disturbance in tape traveling, or during the pull-in process, the signal levels of the f1 and f2 tracking pilot signals become lower. In some of these conditions, pilot detection/identification circuit 106 works incorrectly due to noise components other than the pilot signals, and false pulses may be mixed up with the identification signal 125. Therefore, the stability of operation can be increased by confirming that the disagreement between the two phases continued for a certain period. However, the total time for the pull-in operation becomes longer by a period needed for the confirmation. Specifically, a pulse signal of a predetermined rate (eg. a reference rotation signal) and the output of phase comparator 148 are input to an AND gate, and the number of pulses output from the gate is counted by a counter. Then, after a predetermined number is counted, the output of the phase comparator is inverted.

Figure 8B:
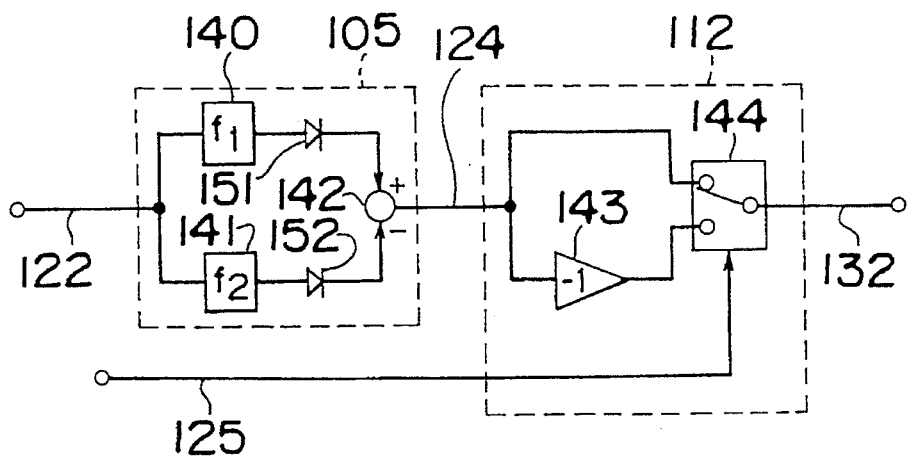

A simpler composition of polarity controller 112 is shown in FIG. 8B. Here, the inversion and non-inversion are directly set depending on the value of the identification signal. By this means, the operation of polarity inversion in the tracking controller is made always stable.

Further, if the trace position shifts from a1 to b1 of FIG. 3, the identification signal 125 takes the same value at any interval between the −1 track and +1 track, as shown in FIG. 3C. Therefore, a polarity is selected so that the pull-in operation is performed to a nearer zero-crossing point. That is, a tracking pull-in is always performed through a shortest path, and the time required for a pull-in becomes minimum.

Next, the operation of frame synchronization is described. First, track number detector 114 extracts a track number from a playback signal 133 to output a number detection signal 130, where the playback signal 133 is obtained by inputting the playback signals 121 and 122 of heads 102a and 102b to switch 113 and by switching them depending on the HSW signal 123. Switch 113 always selects a playback signal of a head currently tracing the tape. A concrete method of composing track number detector 114 depends on the method of recording track numbers, so that its detailed description is omitted here. If data is divided into small blocks (sync blocks) on a recorded track, and if a track number is recorded in each sync block as ID information, then the track number information contained in a specific place of data is extracted from the playback signal through clock extraction, channel-decoding, sync-pattern detection, etc.

When a pull-in of tracking control is completed, information on each track is played back with each trace of head, so that the timing of the reference rotation signal 128 and the playback signals 121 and 122 are in synchronous with each other. However, the frame phases of the played-back signals are indefinite (settled by chance). The frame synchronization adjust the frame phases to a reference frame signal 129.

Phase comparator 115 receives the number detection signal 130 and the reference frame signal 129 generated by reference signal generator 117, compares the frame phase of the number detection signal 130 with the phase of the reference frame signal 129, and outputs the difference between the compared result and a predetermined phase, say 0, as a phase-difference track number 131. The simplest way is to latch the number detection signal 130 with the reference frame signal 129 as shown in FIG. 10. The operation in that case is shown in FIG. 9, where FIG. 9A is the HSW signal, FIG. 9B is the reference frame signal, FIG. 9C shows the number detection signal (here the track numbers) in case the phase difference is 0, and FIG. 9D to FIG. 9G show the track numbers in case the phase differences are not 0. The phase-difference track number in each of FIG. 9C to FIG. 9G is shown on the right end.

Based on these values, phase corrector 116 corrects the playback frame phase so that the difference between the playback frame phase indicated by the number detection signal 130 and the phase of the reference frame signal 129 becomes a predetermined value, say 0. However, the phase correction is performed under the condition that tracking control is stably performed. First, if the phase difference is 0 as shown in FIG. 9C, there is no need of correction. If the phase difference track number is 8 as shown in FIG. 9D, the synchronization is achieved by advancing the tape by two tracks. However, the control polarity of the tracking error signal needs to be reversed after the correction. If the phase difference track number is 6 as shown in FIG. 9E, the synchronization is achieved by advancing the tape by 4 tracks. In this case, the polarity of the tracking error signal 124 does not need to change after the correction. If the phase difference track number is 4 as shown in FIG. 9F, the synchronization is achieved by retarding the tape by 4 tracks. In this case, the polarity of the tracking error signal also does not need to change after the correction. If the phase difference track number is 2 as shown in FIG. 9G, the synchronization is achieved by retarding the tape by 2 tracks. In this case, the control polarity of the tracking error signal needs to be reversed after the correction.

A specific method of the correction is flexible, and an example such that correction is performed by controlling the target speed for capstan controller 108 is described here with reference to FIGS. 11 and 12. FIG. 11 shows an example of advancing the playback frame phase by 2 tracks, where FIG. 11A shows the reference rotation signal 128, FIG. 11B shows a target speed for capstan controller 108, and FIG. 11C shows an actual tape speed change. In ordinary playback (×1), the tape travels 2 tracks during one revolution of the cylinder, i.e. one period of the reference rotation signal. If the tape speed is temporarily changed into 3/2 times (×1.5) the ordinary speed, then the tape travels 3 tracks for the same period. Therefore, the tape speed is changed into 3/2 times the ordinary speed for the number of rotational periods equivalent to the number of tracks to be advanced (in this example, 2 rotational periods=2 periods of the reference rotation signal). However, as shown in FIG. 11C, an actual speed control system has a certain response delay, so that a minute deviation should be accommodated.

FIG. 11 shows an example of retarding the playback frame phase by 4 tracks, and is the same as FIG. 10 except the target speed is ½ times the ordinary speed. The correction operation is achieved by changing the tape speed into ½ times the ordinary speed for 4 rotational periods.

Figure 13:
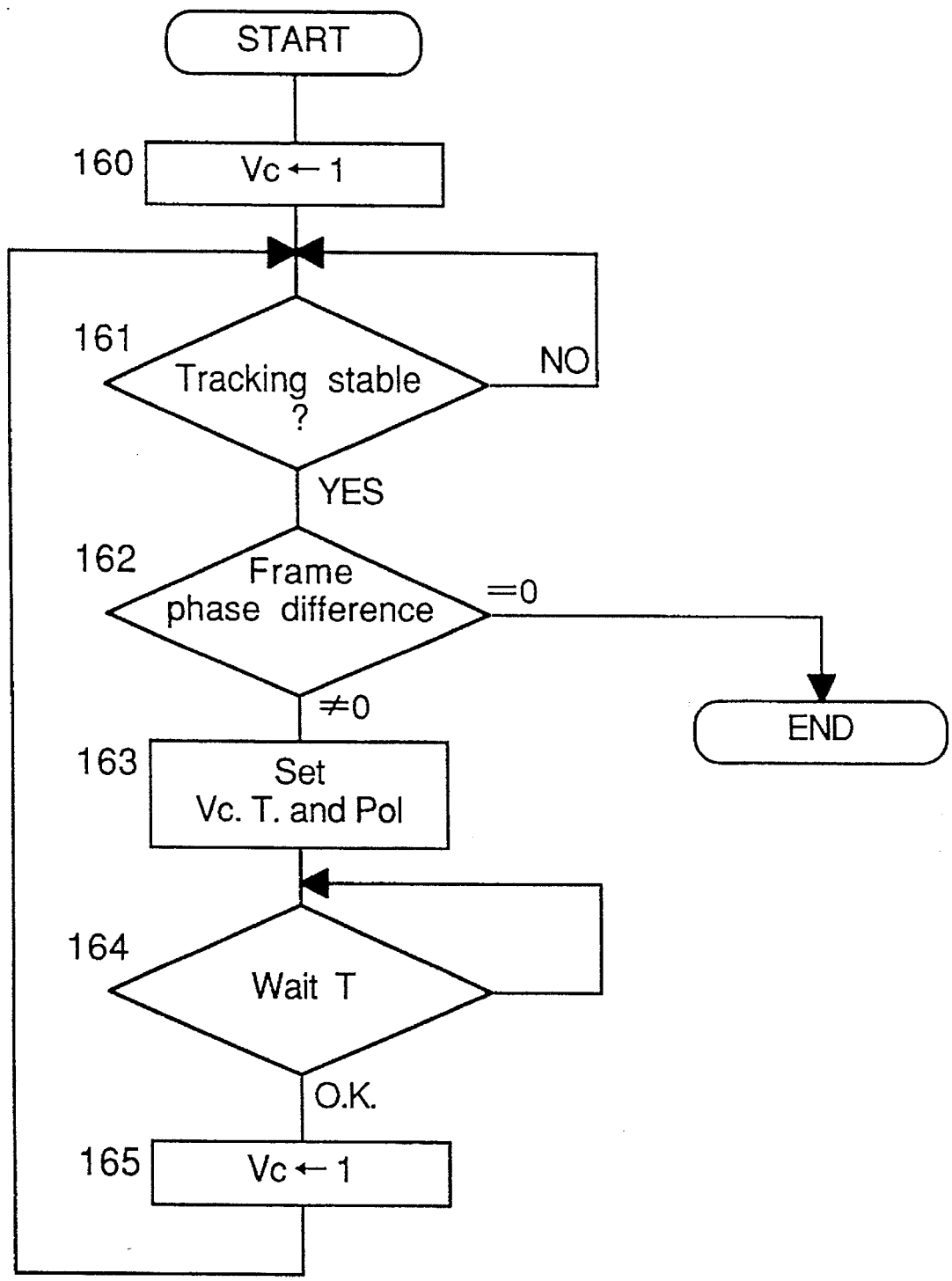
FIG. 13 is a flowchart for describing the operation of a phase corrector.

The above series of operations in phase corrector 116 can be easily realized by a processor and a software procedure. FIG. 13 is a flowchart showing a procedure for starting playback in case phase corrector 116 consists of a microprocessor and software. First, Step 160 gives an ordinary playback instruction (×1) as a speed instruction signal 127 (Vc) to tracking controller 107. Next, Step 161 judges tracking settling by waiting for a certain period of time or by reading the tracking error signal 124 to confirm that its value has become sufficiently small.

After confirming the settling, step 162 reads the phase-difference track number 131. If the number is 0, then the synchronization is completed. If the number is not 0, then step 163 sets the correction time T and the speed instruction signal 127 (Vc) depending on the phase-difference track number, as described above using FIGS. 11 and 12. As for the tape speed, the target tape speed for capstan controller 8 is altered with the signal 127. The correction time may be set using either a built-in timer, or a software timer that counts the pulse numbers of the reference rotation signal 128 or the HSW signal 123.

If the polarity of the tracking error signal has to be reversed after the correction operation, the level of the polarity setting signal 126 (POL) is inverted. If polarity controller 112 is composed as shown in FIG. 8A, and if a delay element (a logic of confirming continuity by means of a counter) is added to the comparator 148, the inversion is effectively done. In fact, if the polarity setting signal 126 is inverted, then the output of EX-OR gate 147 is inverted, so that the transmitted polarity from the output of frequency divider 145 to switch 144 is also inverted. Therefore, the polarity of the output 132 is reversed. If the polarity of the tracking error signal 124 is reversed after the correction, that is, the phase-difference track number is 8 or 2 in the example of FIG. 9, then the polarity of the polarity setting signal 126 is reversed. In this way, effects of detection delay are avoided, and tracking control is stably pulled in after the correction. If the composition of polarity controller is as shown in FIG. 8B, then there is no need of the above inversion operation.

Next, step 164 waits for the time period T set by step 103, and step 165 returns the target speed Vc for capstan controller 7 into the original speed. After that, the procedure returns to step 161 to confirm tracking settlement. Then step 162 tests if the phase-difference track number 131 is 0, and if it is, then the procedure ends. In order to stabilize the correction operation, it is preferable that the operation of tracking control loop is halted (open-loop state) and only the tape speed control is working during the period when the tape speed is temporarily altered.

As described above, the present embodiment performs tracking control by selecting the tracking polarity based on an identification signal and tracking error signal obtained from playback signals of the heads, each playing back tracks one track apart from each other, so that the trace position is pulled into a nearest stable point. Therefore, tracking control is settled in a short time. Further, after the correction of the playback phase by making the phase-difference track number a predetermined value, the tracking polarity can be immediately made in agreement with the playback phase so that stable tracking control is achieved. Therefore, the transition from the start of playback operation to the state in which actual playback of the data signal can be made, i.e. the state in which the phases of the reference frame signal and the playback frame are synchronous with each other, is swiftly achieved.

Figure 14:
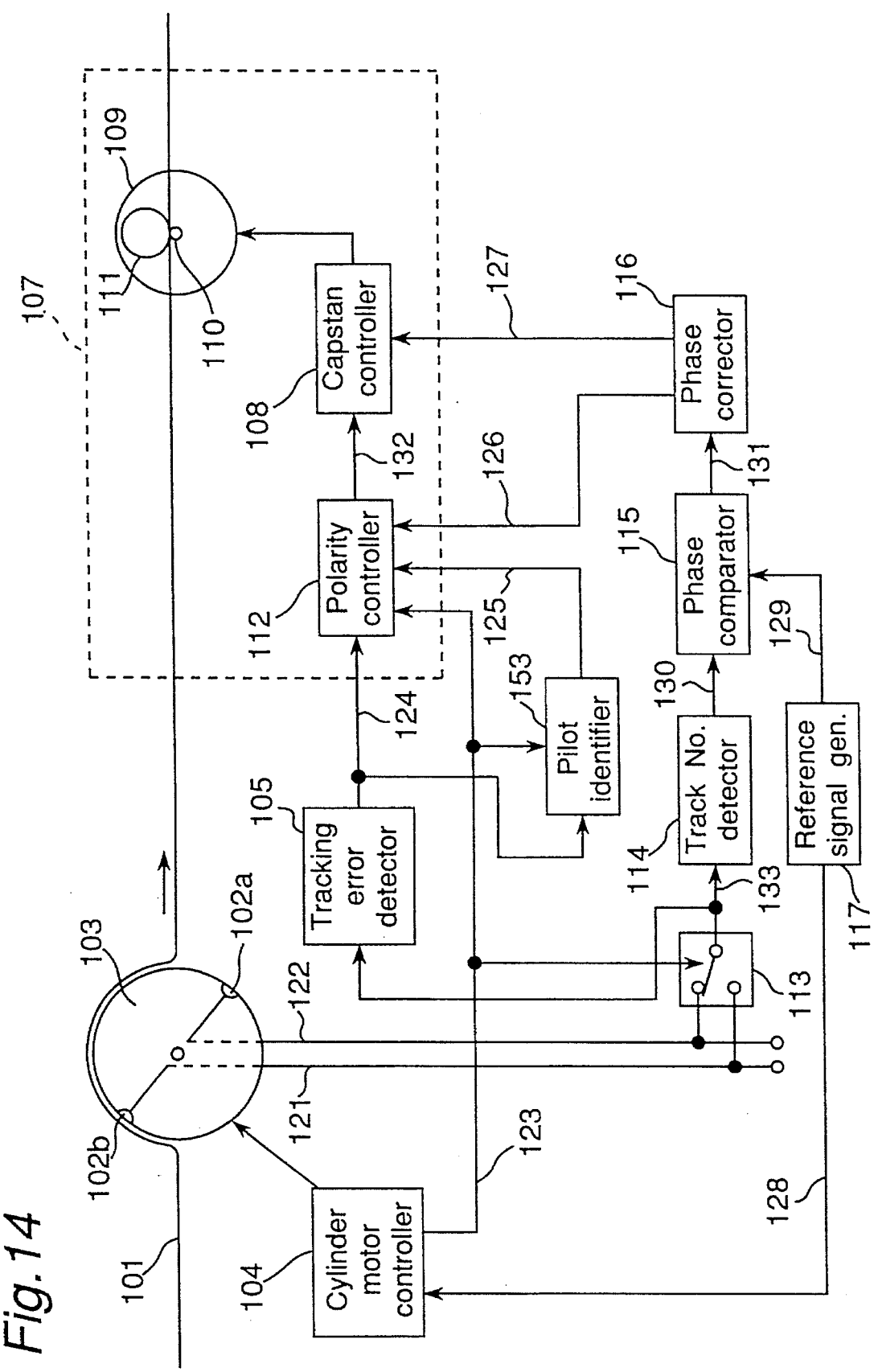
FIG. 14 is a block diagram of another embodiment of the present invention.

The composition of pilot detection/identification circuit 106 and tracking error detector 105 can be simplified as in the second embodiment in which the tracking error detectors 5 and 13 of FIG. 1 were combined into the tracking error detector 5 of FIG. 4. The simplified composition is shown in FIG. 14. The time-shared and combined signal obtained by switch 113 from the playback signals of heads 102a and 102b is input to tracking error detector 105. Further, pilot detection/identification circuit 106 is replaced by a pilot identifier 153, and the tracking error signal 124 is input thereto. The composition of pilot identifier 153 may be the same as the pilot identifier 12 in the previous embodiments as shown in FIG. 1 or FIG. 4. Also, in polarity controller 112, the sample holder 35 and pulse generator 36 in FIG. 1 are added to process the input tracking error signal in the beginning. The operation of setting the polarity of tracking control, the effects on the speed-up of a tracking pull-in, the frame synchronization and its effects are the same as in the composition of FIG. 6.

Figure 15:
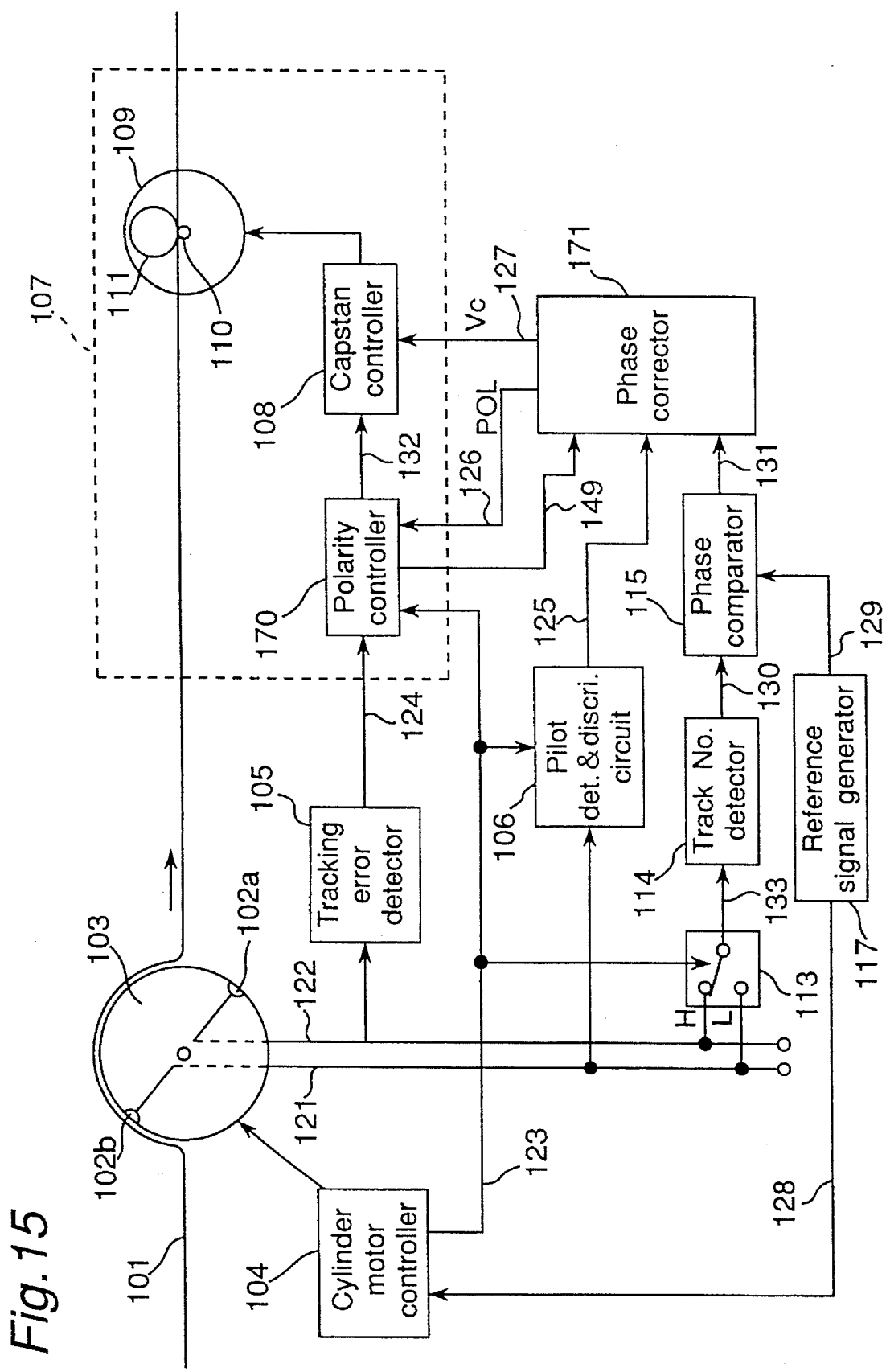
FIG. 15 is a block diagram of another embodiment of the present invention.
Figure 16:
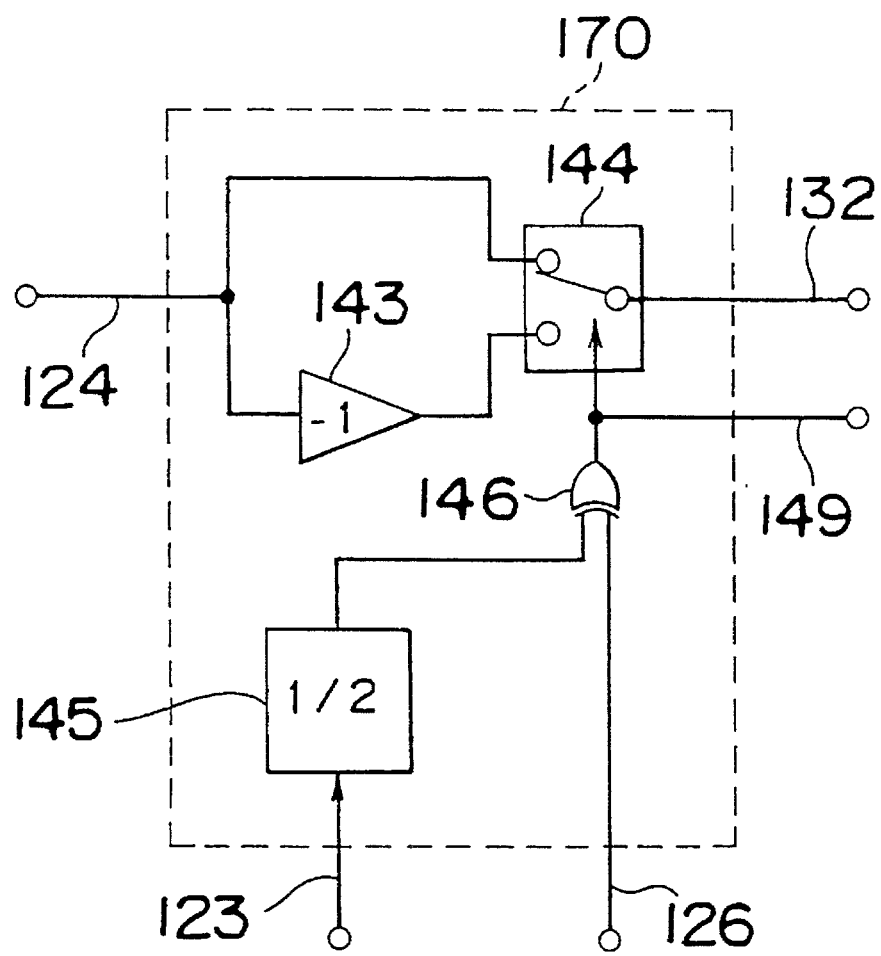
FIG. 16 is block diagram of a polarity controller.
Figure 17:
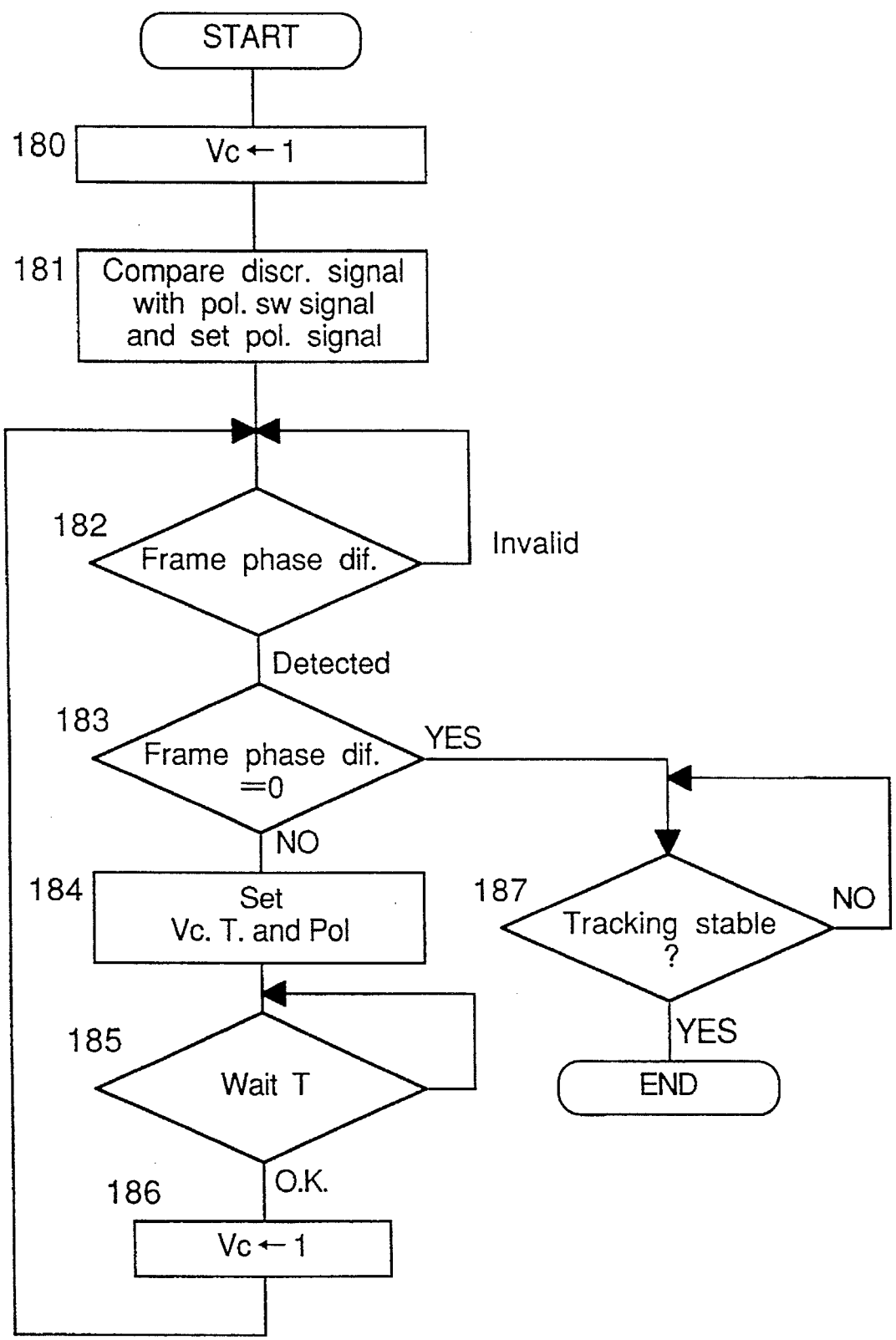
FIG. 17 is a flowchart for describing the operation of a phase corrector.

Another embodiment is described in the following. The composition illustrated by the block diagram FIG. 15 speeds up the state transition further more by making the tracking pull-in process and frame phase correction process simultaneously proceeding. The composition of FIG. 15 is the same as that of FIG. 6 except the polarity controller 170 and the phase corrector 171. FIG. 16 is a block diagram showing the composition of polarity controller 170, and FIG. 17 is a flow chart showing a procedure of starting playback in case phase controller consists of a microprocessor and software.

Cylinder controller 104 controls the rotation of cylinder 103 in synchronous with the reference rotation signal 128. Capstan controller 108 moves tape 1 at a predetermined speed. Tracking error detector 105 detects the tracking error signal 124. Pilot detection/identification circuit 106 detects and identifies the tracking pilot signals. Track number detector 114 detects the track number. Phase comparator 115 detects the phase-difference track number 131. These operations are the same as the embodiment shown in FIG. 6. However, in the present embodiment, phase correction is performed as soon as the identification signal 125 and the phase-difference track number 131 are detected without waiting for tracking settlement, so that additional functions are assigned to some of the components. When tracking is not settled, in particular, when the tracking error is great, the playback signals 121 and 122 are not obtained correctly, so that track number detector 114 sometimes can not detect the track number. Therefore, if the track number can not be obtained, there is a need of finding that the number detection signal 130 is invalid. In this case, for example, track number detector 114 outputs the number detection signal having a value other than the track numbers 0 to 9. Similarly, if the number detection signal 130 is invalid, phase comparator 115 outputs a value indicating the invalidity as the phase-difference track number 131.

The operation of phase corrector 171 is described in the following with reference to the flow chart shown in FIG. 17. First, step 180 gives an ordinary playback instruction (×1) as a speed instruction signal 127 (Vc) to tracking controller 107. Next, step 181 identifies the tracking polarity at the current trace position, that is, compares the identification signal 125 with the polarity signal 149. Before this identifying operation is described, the composition of polarity controller 170 is described. Polarity controller 170 is composed as shown in FIG. 16. The HSW signal 123 is frequency-divided into a signal having ½ the original frequency by a frequency divider 145 and input to an EX-OR gate 146, which outputs the polarity signal 149, which switches switch 144. The polarity setting signal 126 is applied to the other input terminal of the EX-OR gate, so that the polarity of the polarity setting signal can be reversed. Now, assume that the tracking loop is set so that if the polarity signal 149 and the identification signal 125 have the same phase, then tracking control is stable. Step 181 compares the polarity signal 149 with the identification signal 125 for their phases to judge their agreement. If they disagree, then it takes a long time for a pull-in, so that the polarity setting signal 126 is inverted to match the tracking polarity.

Next, step 182 waits for detection of the phase-difference track number 131, that is, waits for a valid phase-difference track number to be obtained. Step 183 tests if the phase-difference track number is 0. If it is, the synchronization is completed, and the procedure proceeds with step 187. If it is not 0, then step 184 sets the correction time T and the speed instruction signal 127 (Vc) depending on the phase-difference track number 131, as described previously using FIGS. 11 and 12. As for the tape speed Vc, the target tape speed for capstan controller 8 is altered with the signal 127. The correction time may be set using either a built-in timer, or a software timer that counts the pulse numbers of the reference rotation signal 128 or the HSW signal 123.

Further, the polarity setting signal 126 is processed here depending on the phase-difference track number 131. If the track number to be corrected is ±2, then the tracking polarity is reversed after the correction, and if the track number to be corrected is ±4, then the tracking polarity is preserved. Therefore, if the track number to be corrected is ±2, then the polarity setting signal 126 is inverted, and if the track number to be corrected is ±4, then the polarity signal is non-inverted.

Step 185 waits for the time period T set by step 184, and step 186 returns the target speed Vc for capstan controller 7 into the original speed. After that, the procedure returns to step 182 to detect the phase-difference track number. Then step 183 tests if the phase-difference track number is 0, and if it is, that is, if the correction operation has been normally performed, then the procedure proceeds with step 187 to wait for tracking settlement. In fact, at this point, a pull-in for tracking control has not been completed, so that the procedure wait for a response time for the tracking control loop. Alternately, step 187 waits for the tracking error signal to converge by directly observing it. In this way, a series of phase correction operations has been completed. From the view point of stabilizing the correction operations, the operation of tracking control loop is preferably stopped (an open loop state) and only the speed control is performed in capstan controller 108 during the period when the tape speed is temporarily altered.

As described above, the present embodiment detects the identification signal in the pilot detection/identification circuit, detects the phase-difference track number in the track number detector and correction amount detector to correct the playback phase based on the detected phase-difference track number, and selectively sets the tracking polarity based on the identification signal and the phase-difference track number, so that tracking control becomes stable with the corrected playback phase. Therefore, after the tape is started to travel, the phase correction operations are completed in a short time, and the polarity of tracking control is stably pulled in at the current trace position. Therefore, transition from the start of playback operation to the state in which actual playback of the data signal can be made, i.e. the state in which the phases of the reference frame signal and the playback frame are synchronous with each other, is swiftly achieved.

The present embodiments are only examples of the present invention. The number of tracks constituting one frame, the positions and methods of recording tracking pilot signals, the head positions on the cylinder, the number of heads, etc. can be varied.

The composition of the tracking error detector and tracking means are not limited to those described in the present embodiments. The tracking means may be anything that works on the tracking polarity based on the recorded pattern of tracking pilot signals and also based on a phase correction means. The tracking means may include an integral compensation filter and the like that improve the tracking characteristics depending on necessity.

The pilot detection identification means may be anything that identifies pilot signals contained in the playback signals of the heads respectively tracing alternate tracks. The pilot detection and identification means may share part of its composition with the tracking error detector as described in some of the present embodiments. The method of identification is not restricted.

Correction algorithms in the phase correction means and actual methods of phase correction are not limited to those described in the present embodiments.

Thus, although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An information playback apparatus that plays back a signal by causing heads that are mounted on a rotary cylinder to trace a tape medium on which at least two different kinds of tracking pilot signals are selectively and periodically recorded with a period of at least 4 tracks, said apparatus comprising:

a first head, a second head that traces a position shifted from the trace position of said first head by approximately one track, a pilot detection and identification means that detects respective amplitudes of said tracking pilot signals contained in a playback signal output from said first head and identifies the kind of the tracking pilot signal dominantly contained in the playback signal based on the thus detected respective amplitudes, a tracking error detecting means that detects respective amplitudes of said tracking pilot signals contained in a playback signal output from said second head and generates a tracking error signal based on the thus detected respective amplitudes, and a tracking means that switches a polarity of said tracking error signal when a predetermined change has occurred in the kind of the tracking pilot signal identified by said pilot detection and identification means and performs tracking control based on said tracking error signal having the thus switched polarity.

2. An information playback apparatus that plays back a signal by causing heads that are mounted on a rotary cylinder to trace a tape medium on which a first tracking pilot signal and a second tracking pilot signal having a frequency which is different than that of said first tracking pilot signal are alternately recorded, each separated from the other by one track, said apparatus comprising:

a first head, a second head that traces a position shifted from the trace position of said first head by approximately one track, a pilot detection and identification means that detects respective amplitudes of said first and second tracking pilot signals contained in a playback signal output from said first head and identifies which one of the first and second tracking pilot signals is dominantly contained in said playback signal based on the thus detected respective amplitudes, a tracking error detecting means that detects respective amplitudes of said first and second tracking pilot signals contained in a playback signal output from said second head and generates a tracking error signal based on the thus detected respective amplitudes, and a tracking means that switches a polarity of said tracking error signal when a predetermined change has occurred between the one of the first and second tracking pilot signals identified by said pilot detection and identification means and performs tracking control based on said tracking error signal having the thus switched polarity.

3. An information playback apparatus that plays back a signal by causing heads that are mounted on a rotary cylinder to trace a tape medium on which a first tracking pilot signal and a second tracking pilot signal having a frequency which is different than that of said first tracking pilot signal are alternately recorded, each separated from the other by one track, said apparatus comprising:

a first head having an azimuth which coincides with that of the tracks in which said first and second tracking pilot signals are recorded, a second head having an azimuth which coincides that of the tracks in which neither said first nor said second pilot signal is recorded and mounted in said cylinder in a position which is 180 degrees from a mount position of said first head, a tracking error detecting means that detects respective amplitudes of said first and second tracking pilot signals from a signal obtained by combining playback signals output from said first and second heads in a time sharing manner and generates a corresponding tracking error signal, a pilot identifying means that identifies which one of the first and second tracking pilot signals is dominantly contained in the playback signal output from said first head based on said tracking error signal and outputs a corresponding identification signal, and a tracking means that switches the polarity of said tracking error signal for a trace period of said second head based on said identification signal and performs tracking control based on said tracking error signal and said identification signal.

4. An information playback apparatus as defined in claim 3 wherein:

said tracking error detecting means outputs a difference between the detected amplitude of said first tracking pilot signal and the detected amplitude of said second tracking pilot signal as said tracking error signal, and said pilot identifying means identifies said tracking pilot signals based on a level difference of said tracking error signals output for successive two trace periods of said first head.

\* \* \* \* \*